(12) United States Patent
Lacagnina et al.

(10) Patent No.: US 8,004,718 B2
(45) Date of Patent: Aug. 23, 2011

(54) POST RIP TRAPPING

(75) Inventors: Michael C. Lacagnina, Penfield, NY (US); Guo-Yau Lin, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 374 days.

(21) Appl. No.: 12/351,875

(22) Filed: Jan. 12, 2009

(65) Prior Publication Data

US 2010/0177355 A1 Jul. 15, 2010

(51) Int. Cl.
*G06K 15/00* (2006.01)

(52) U.S. Cl. .......... 358/3.06; 358/1.9; 358/2.1; 382/163

(58) Field of Classification Search .............. 358/3.06, 358/1.9, 2.1; 382/163

See application file for complete search history.

(56) References Cited

U.S. PATENT DOCUMENTS

| | | | |
|---|---|---|---|
| 7,009,735 B2 | 3/2006 | Ebner | |
| 7,139,098 B2* | 11/2006 | Klassen | 358/1.9 |
| 7,339,701 B2 | 3/2008 | McElvain | |
| 7,385,727 B1 | 6/2008 | Markovic et al. | |
| 2003/0025945 A1* | 2/2003 | Rumph et al. | 358/426.13 |
| 2007/0103732 A1 | 5/2007 | Lin et al. | |
| 2007/0216930 A1* | 9/2007 | Jacobs et al. | 358/1.14 |
| 2008/0007752 A1* | 1/2008 | Gandhi et al. | 358/1.9 |
| 2008/0239343 A1 | 10/2008 | Ochs et al. | |
| 2009/0141972 A1* | 6/2009 | Weiner et al. | 382/163 |

* cited by examiner

*Primary Examiner* — Twyler Haskins
*Assistant Examiner* — Michael Burleson
(74) *Attorney, Agent, or Firm* — Oliff & Berridge, PLC

(57) ABSTRACT

Image data representing an image is obtained, raster image processing is performed on the image data, and then trapping is performed on the image data after raster image processing. The trapping may be performed based on a tag plane generated during the raster image processing, or the determination of which pixels to trap may be performed after the raster image processing.

18 Claims, 11 Drawing Sheets

POST RIP TRAPPING

BACKGROUND

This disclosure relates to trapping to reduce the effects of printer misregistration.

The problem of misregistration is a mechanical problem, almost always existing in printing systems. The problem arises because color separations are not laid exactly where intended, due to inherent imperfections in any separation registration system. It is somewhat correctable by mechanical registration methods; however it is rarely completely correctable. In expensive, high-end printing processes, customers have high expectations that misregistration artifacts will not be visible. In inexpensive, low-end printers, mechanical registration techniques are so expensive as to be infeasible; thus, a non-mechanical method of correction, often referred to as trapping, is typically used instead.

Different printing technologies have distinct misregistration artifacts. Offset printing tends to have uniform misregistration in all directions. However, xerographic printing tends to have more misregistration in a single direction.

Methods for correcting misregistration are known. The general approach is to expand one of the abutting regions' separations to fill the gap or misregistration border region with a color determined to minimize the visual effect when printed. Borders or edges expanded from a region of one color to another in this manner are said to be "spread." A border, which has been expanded, is referred to as a "trap," and the zone within which color is added is called the "trap zone."

Commonly used methods for automatic trapping of digital images fall into the categories of vector-based and raster-based methods. Vector-based methods rely on images that have been converted from a page-description language form, describing objects as characters, polygonal shapes, etc. into an internal data structure containing not only object information, but also a list of all the edges between regions of different color. Raster-based methods rely on images that have been first scanned or converted from page-description based form and are stored internally as a sequence of (high resolution) scan lines each containing individual scan elements or pixels. These methods process each raster line in sequence and compare one or more adjacent pixels to determine color boundaries. After some initial processing to find edges, both vector-based and raster-based methods apply rules for determining whether or not to create a trap at such boundaries, and finally apply a second set of rules to determine the nature of the trap if one is to be created.

Now that trapping has been introduced, a specific type of printer will be discussed. A significant amount of color printing can be performed using a highlight color printer. In this type of printing, two inks are typically used in the printing process. These inks typically comprise black and a highlight color (specific examples are red or blue). Electronic printers may be designed specifically for highlight color printing. Highlight color printers are generally faster and less expensive than full color printers because only two inks are processed, as opposed to the three or four inks, which can be processed in order to obtain full color images. One such application is a teacher's edition textbook, which includes single color main text, such as black, and highlight color answers, printed in a highlight color such as red. For a highlight printer, besides black toner, additional color toner is used to add the accent in the document to draw attention. Other examples of accented areas of a document include a company logo, the balance in the bill, an important message in a document, etc.

Occasionally, the region covered only by the black toner and the region covered only by the highlight toner abut each other. If the registration is off and these regions are pulled away from each other, one would observe a white gap between the regions exposing an uncovered print medium.

For exemplary purposes, FIGS. 1 and 2 show an image with perfect registration. FIG. 1 shows a black region 10 and a black region 20 are disposed in, but do not overlap with, a block of highlight color 30. FIG. 2 is an enlargement of FIG. 1. Hereinafter, the specification will describe this block of highlight color 30 as halftone, but it is understood that this block of highlight color 30 may be solid.

In contrast, FIGS. 3 and 4 show the same image of FIG. 1 printed with misregistration. In this case, the highlight block 30 is shifted up and to the left relative to black regions 10, 20. FIG. 3 shows how the image under misregistration causes the white gaps 40, 60 to appear because of the exposed white print medium. FIG. 3 also shows how the misregistration creates an overlapped area 50 (from the highlight and black bitmaps). The white gaps 40, 60 and overlapped area 50 are artifacts of the misregistration. FIG. 4 is an enlargement of FIG. 3.

Some conventional trapping methods are disclosed in United States Patent Application Publication 2008/0239343 and U.S. Pat. No. 7,139,098, both of which are incorporated herein by reference in their entirety.

SUMMARY

Exemplary embodiments discussed herein address the above-described artifacts of misregistration. An exemplary method obtains image data representing an image, performs raster image processing on the image data, and then traps the image data after raster image processing. The raster image processing may generate from image data of a full color image a color plane and a highlight plane. The color plane and the highlight plane may have pixels containing contone values. The raster image processor may then convert the color plane and the highlight plane respectively into a color bitmap and a highlight bitmap and output the bitmaps to a post RIP trapper.

After the raster image processing, a post RIP trapper determines pixels eligible to be trapped in one of the color (usually black) bitmap and the highlight bitmap, and assigns to some of the pixels eligible to be trapped a bitmap value copied from a nearby pixel in the other of the color plane and the highlight plane. Some of the added pixels in the trap area can be optionally removed to soften the effects of trapping.

In an exemplary trapping method, a tag plane generator in the RIP generates a tag plane bitmap to designate pixels eligible to be trapped. The designation for each pixel is based on the respective contone values in the color plane and the highlight plane relative to predetermined threshold values for the color and the highlight color. The post RIP trapper then uses this tag plane bitmap to determine which pixels eligible for trapping will be trapped. The post RIP trapper assigns to each determined pixel the bitmap value of a nearby pixel for the highlight bitmap.

In another exemplary trapping method, the post rip trapper has a trapping enabler. The trapping enabler generates the equivalent of a tag plane that identifies the tag value of each pixel to determine whether the pixel is eligible to be trapped. The trapping enabler generates the tag values by comparing pixel values in color and highlight bitmaps.

An image processing apparatus is also described herein. An image processing apparatus includes a raster image processor that obtains image data from an image source and generates from the image data a color plane and a highlight plane. The image processing apparatus also includes a post-raster-image-processor trapper for trapping image data output from the raster image processor. The image processing apparatus further includes a memory, a bus and a controller for storing, processing and controlling the image data. In an embodiment, the RIP may have a tag plane generator to generate a tag plane indicating the tag state for each pixel. In another embodiment, the post RIP may have a trapping enabler to determine the tag state for each pixel.

Xerographic marking devices, highlight printers and duotone printers that include an image processing apparatus or incorporate the image processing method are also described herein.

BRIEF DESCRIPTION OF THE DRAWINGS

Exemplary embodiments will be described with reference to the drawings, wherein like numerals represent like parts, and wherein.

EMBODIMENTS

Trapping is usually applied on contone color image data during raster image processing ("RIP"). However, once the image data is output as a bitmap from the raster image processing unit, the color and object information have been lost. After the image is processed by the raster image processor, the trapping process no longer recognizes objects and therefore their boundaries, and usually requires intensive processing, halftone pattern recognition, and cross talk between separations.

The exemplary image processing apparatus and methods herein can perform trapping on an image after being processed by a raster image processor ("RIP"). An advantage is that the trapping methods herein are operational on bitmap images even after much of the image information has been discarded from, e.g., full color images in page description language.

Figure 5:
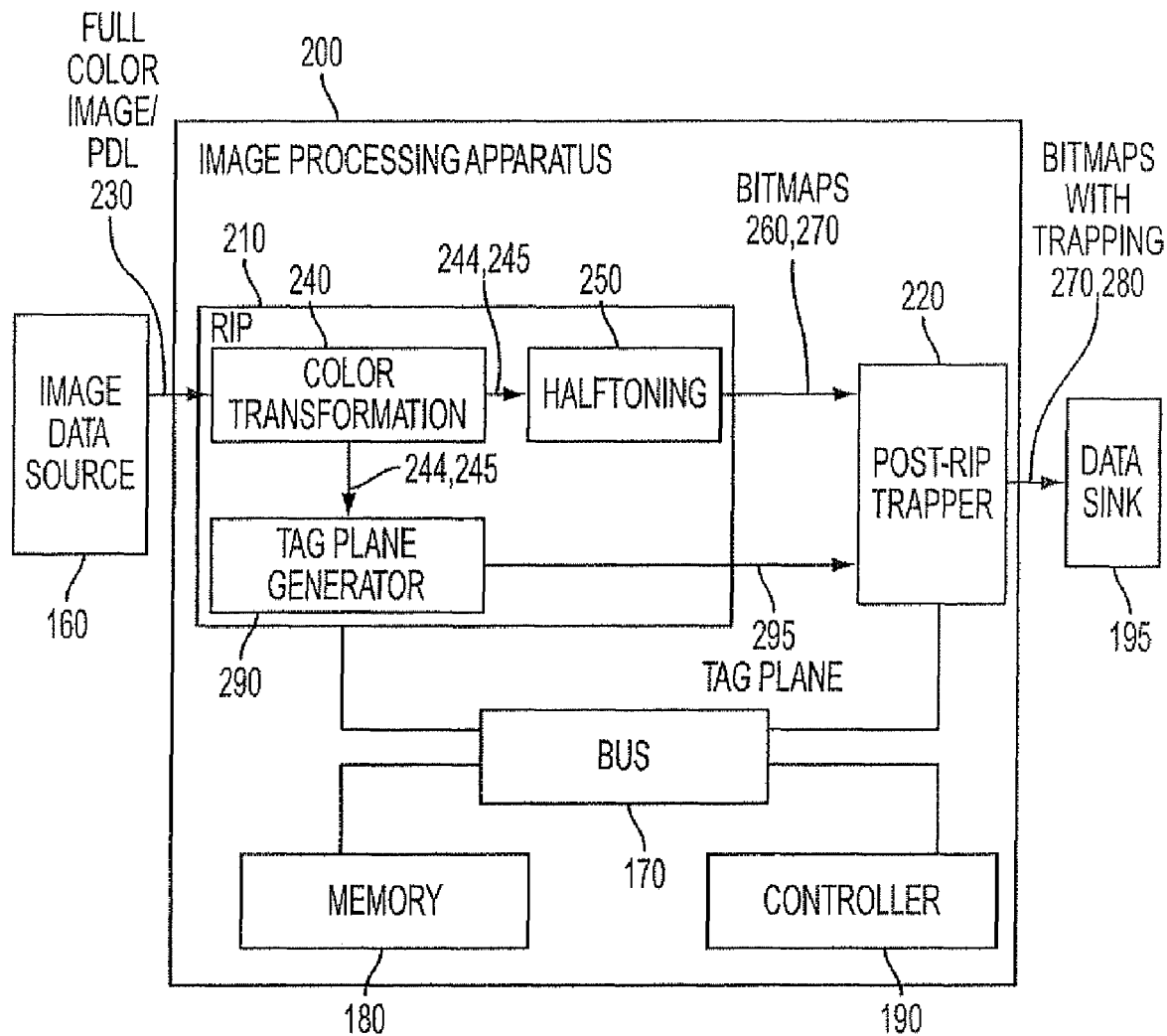
FIG. 5 is a functional block diagram illustrating an exemplary embodiment of an image processing apparatus.

FIG. 5 is a functional block diagram illustrating a first exemplary embodiment of image processing apparatus 200. Specific examples of image processing apparatus 200 include, according to the embodiments within this disclosure, a highlight printer, a duotone printer, a copier, a xerographic device, a facsimile machine, a computer or a multi-function device. These image processing apparatus can be for personal or commercial production use.

The image processing apparatus 200 includes raster image processor ("RIP") 210, a post-RIP trapper 220, bus 170, memory 180 and controller 190. In an embodiment, the RIP 210 has a color transformation processor 240, a halftoning processor 250 and a tag plane generator 290. The image processing apparatus 200 is connected to an image data source 160 and a data sink 195.

The memory 180 may serve as a buffer for information coming into or going out of the image processing apparatus 200, may store any necessary programs and/or data for implementing the functions of the image processing apparatus 200, and/or may store data at various stages of processing. Further, it should be appreciated that the memory 180, while depicted as a single entity, may actually be distributed. Alterable portions of the memory 180 are, in various exemplary embodiments, implemented using RAM. However, the memory 180 may also be implemented using disk storage, optical storage, flash memory or the like.

The controller 190 controls the operation of other components of the image processing apparatus 200, performs any necessary calculations and executes any necessary programs for implementing the processes of the image processing apparatus 200 and its individual components, and controls the flow of data between other components of the image processing apparatus 200 as needed.

The image data source 160 can be a digital camera, a scanner, or a locally or remotely located computer, or any other known or later developed device that is capable of generating electronic image data. Similarly, the image data source 160 can be any suitable device that stores and/or transmits electronic image data, such as a client or a server of a network. The image data source 160 can be integrated with the image processing apparatus or be connected over a connection device, such as a modem, a local area network, a wide area network, an intranet, the Internet, any other distributed processing network, or any other known or later developed connect device.

The image data source 160 inputs a full color image 230 is inputted into the image processing apparatus 200. Specific examples of the full color image 230 include an image in page description language (PDL), e.g., an image in RGB color space or an image in CMYK color space. Generally speaking, besides color transformation, RIP also includes other processing modules for various PDLs, for example, an interpreter, a flattener, etc. The interpreter may translate Postscript language into object level data. The flattener determines the relative location of the objects in the object level data and converts the layers of objects into a single layer. For simple jobs that are in standard image format, e.g. JPEG and TIFF, the interpreter and the flattener may only deal with simple processes such as rescaling, rotation, and translation. Before rasterization, the full color image 230 may contain object information. Other specific examples of the full color image can be a scanned-in photograph, a document output from a word processing program, or any type of image-like file that can be sent to an image marking device. Within the image processor 200, the full color image 230 enters the RIP 210.

Within the RIP 210, the color transformation processor 240 converts the full color image 230 into a two-dimensional representation (h,k) for each pixel. (h,k) represent respectively the contone values for the highlight and color planes 244, 245. A specific example of a color plane 245 is a black color plane, which is designated k for the rest of the disclosure. Specific examples of the highlight plane 244 color are red, green, or blue. More generically, the highlight plane 244 and color plane 245 are simply a first color plane and a second color plane, respectively, but for convenience hereafter the terms "color plane" and "highlight plane" will be used. It will be appreciated, however, that these terms do not limit this disclosure to a highlight printer, and that duotone printers and other marking devices are included.

The tag plane generator 290 assigns a tag value of 1 (T(i,j)=1), or creates a "tag," for each pixel eligible to be trapped. These tags will be used as described below to determine which pixels are eligible to be trapped. The trapping may be done by altering data values in the highlight bitmap 260 and/or the color bitmap 270, depending on which color is lighter. If the lightness of the highlight toner is lighter then the lightness of the other color toner, trapping is applied to the highlight bitmap; if it is darker, trapping is then applied to the color bitmap. If the lightness of the highlight and the color toner is similar, the trapping may be done by altering both highlight and the color bitmaps. However, for convenience, the following description will refer to the values being altered in the highlight bitmap 260. The tag plane generator 290 generates a tag plane bitmap 295, which stores the information of the tagged pixels. The tag plane generator 290 calculates these tags for each pixel eligible to be trapped. For example, the tag plane generator 290 may apply the following formula:

$$T(i,j) = \begin{cases} 1, & \text{if } k(i,j) > k_0 \text{ and } h(i,j) < h_0 \\ 0, & \text{else} \end{cases} \quad (1)$$

where T(i,j), k(i,j) and h(i,j) are respectively the bitmap values of the tag plane 295, the contone value of the color plane 245, and the contone value of the highlight plane 244 at present pixel image coordinates (i,j). Here, $h_0$ and $k_0$ act as threshold values. $k_0$ is the minimum level at which a black halftone pattern appears solid. In general, $k_0$ is around 245 (in scale of 0 to 255), depending on the xerographic characteristics and medium type. $h_0$ is the maximum level at which a highlight halftone pattern appears the color of the print medium. In general, $h_0$ is around 6 (in scale of 0 to 255), also depending on the xerographic characteristics and medium type. (comment: k0 and h0 are thresholds for contone inputs, and irrelevant to the patterns) In this embodiment, determining which pixels are eligible to be trapped is decided in the RIP.

The highlight plane 244 and the color plane 245 then pass through the halftoning block 250, which creates highlight and color bitmaps 270, 260. The RIP 210 outputs to the post-RIP trapper 220 a color bitmap 270, a highlight bitmap 260 and a tag plane 295.

In the post-RIP trapper 220, the pixels eligible to be trapped are identified based on the tags in the tag plane 295. Specifically, the post-RIP trapper 220, for each subject pixel at (i,j) eligible to be trapped, identifies the bitmap value of nearby pixel at (k,l) at a trapping radius r. Based on the trapping radius, the pixel at (k,l) may be an adjacent, neighboring one or nearby to the pixel at (i,j). The term "nearby" will be used for convenience throughout the rest of the specification, and means a pixel separated from the (i,j) pixel at a distance of the trap radius. Trapping radius r is the absolute value of the distance between (i,j) and (k,l). In an exemplary embodiment, nearby pixels are in the +x or −x direction (j=l) or the +y or −y direction (i=k). For the pixels in the color bitmap 270 that are to be trapped, the nearby halftone value in the highlight bitmap 260 is copied. In effect, on the macro level, this copying extends the bitmap pattern of the highlight bitmap 260 to the extent where there is overlap with the color bitmap 270 along the abutting edges of the highlight bitmap 260 and color bitmap 270. The overlap is known as the trap area. The extended bitmap pattern gives the appearance of continuity from the pre-existing pattern in the highlight bitmap 260. As described above, the pattern can also be extended from color bitmap into the highlight bitmap, depending on the lightness of the highlight and the color toner. The post-RIP trapper 220 updates the halftone state of neighboring pixels at the trapping radius. For example, the post-RIP trapper 220 may apply the following formula:

$$H'(i,j) = \max\{H(k,l) \| (i,j)-(k,l) \| = r, T(i,j)=1\} \quad (2)$$

where r is the trap radius, (i,j) is the subject pixel being considered, (k,l) is the nearby pixel at a distance of r (in pixels) from the subject pixel (i,j), H(x,y) is the bitmap value at the highlight bitmap 260 at (x,y) before trapping, and H'(x,y) is the newly assigned bitmap value at the highlight bitmap 260 at (x,y) after trapping. As can be seen from the formula, the maximum bitmap value of pixels nearby the subject pixel at a trapping radius r is chosen: if none of the nearby highlight pixel is turned on (bitmap value equals "1"), the result remains off ("0"); if any of the nearby pixels at trapping radius r is turned on, the result becomes "1". The highlight bitmap value is copied from a pixel next to the black pixels, and used to update the values of pixels in the trap area. The trap area is the area proximate to the color/highlight edge where the pixels are tagged and later trapped. In an embodiment, the trap area is on the color side of the color/highlight edge. That is, a nearby highlight bitmap value will be copied to the subject highlight pixel near color/highlight edges. The trap radius r can be arbitrarily selected, or can be set based on the observed extent of misregistration for a given system. The trap radius r may also be set based on the size of the features in the image.

The post-RIP trapper 220 outputs a color bitmap 270 and a trapped highlight bitmap 280 to data sink 195. In general, data sink 195 can be any device that is capable of outputting or storing the processed data generated by the image processing apparatus 200, such as a color marking device, printer, a copier or other image forming devices, a facsimile device, a display device, a memory, or the like.

An optional override may be implemented to reduce the artifacts at corners. For example, after formula 2 is applied so that the maximum H(k,l) value is scanned for in the x direction, the maximum H(k,l) value in the y direction will replace the maximum H(k,l) value already scanned. In this way, the corners of the trap area may still appear to have a single pattern.

Figure 6:
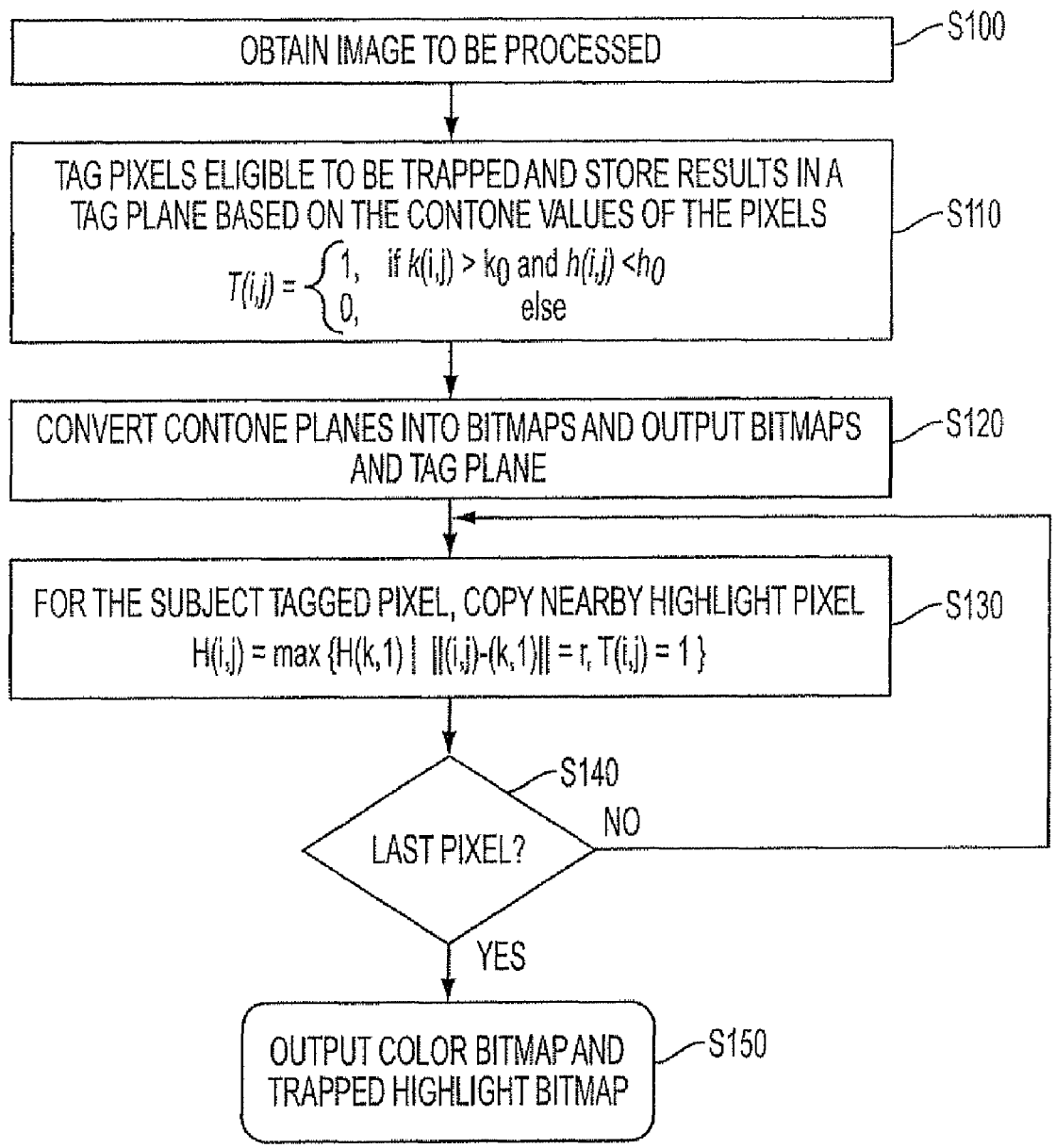
FIG. 6 is a flowchart illustrating a first exemplary trapping method.

FIG. 6 shows an exemplary post-RIP trapping method. Step S100 obtains an image to be processed from the image data source 160. Steps S110 and S120 are performed in the RIP 210. In step S110, tagging is performed to enable identification of pixels to be trapped. The results are stored in a tag plane 295 based on contone values of the pixels. The tagging process may, for example, follow formula (1) described above. That is, based on the contone value of each pixel relative to the threshold values, $k_0$ and $h_0$, each pixel is either tagged a "1" or a "0" in the tag plane bitmap 295. Step S120 converts the contone planes into bitmaps 260, 270 and outputs the bitmaps 260, 270 and the tag plane 295 to the Post-Rip Trapper 220.

Then, step S130 involves the process of formula (2) where, for the subject tagged pixel, a nearby highlight pixel at a trap distance r from the subject pixel is copied to the highlight bitmap 260 at the location of the subject pixel. For example, for a subject tagged pixel, step S130 checks nearby pixels at location (k,l) at a trap distance r from the subject pixel to see if there is a nearby highlight bitmap value of "1," a maximum possible value for a bitmap. If S130 detects a value of "1" in a nearby pixel, step S130 copies the value of "1" to the subject pixel. If S130 detects a value of 0 in a nearby pixel, step 130 copies the value of "0," effectively not changing the current value of "0." Step S140 involves iterating through each tagged pixel until the last pixel is processed. S150 involves outputting the trapped highlight bitmap 280 and the color bitmap 270. In this way, the bitmap pattern near the edges in the highlight bitmap 260 is preserved in the trapping area.

An advantage of the system and method described above is that the trapped bitmaps can be made with much less processing than the trapping of full color images in the RIP 210 if, for example, only the image bitmaps are processed during trapping. This is because trapping done during RIP at the object level would introduce more complexities in interpreting PDLs. Such complexities may include generating the appropriate trap color and the trap distance for the abutting objects on the fly based on the object colors and shapes, flattening the objects in consideration of the trap color and trap distance, etc.

Figure 7:
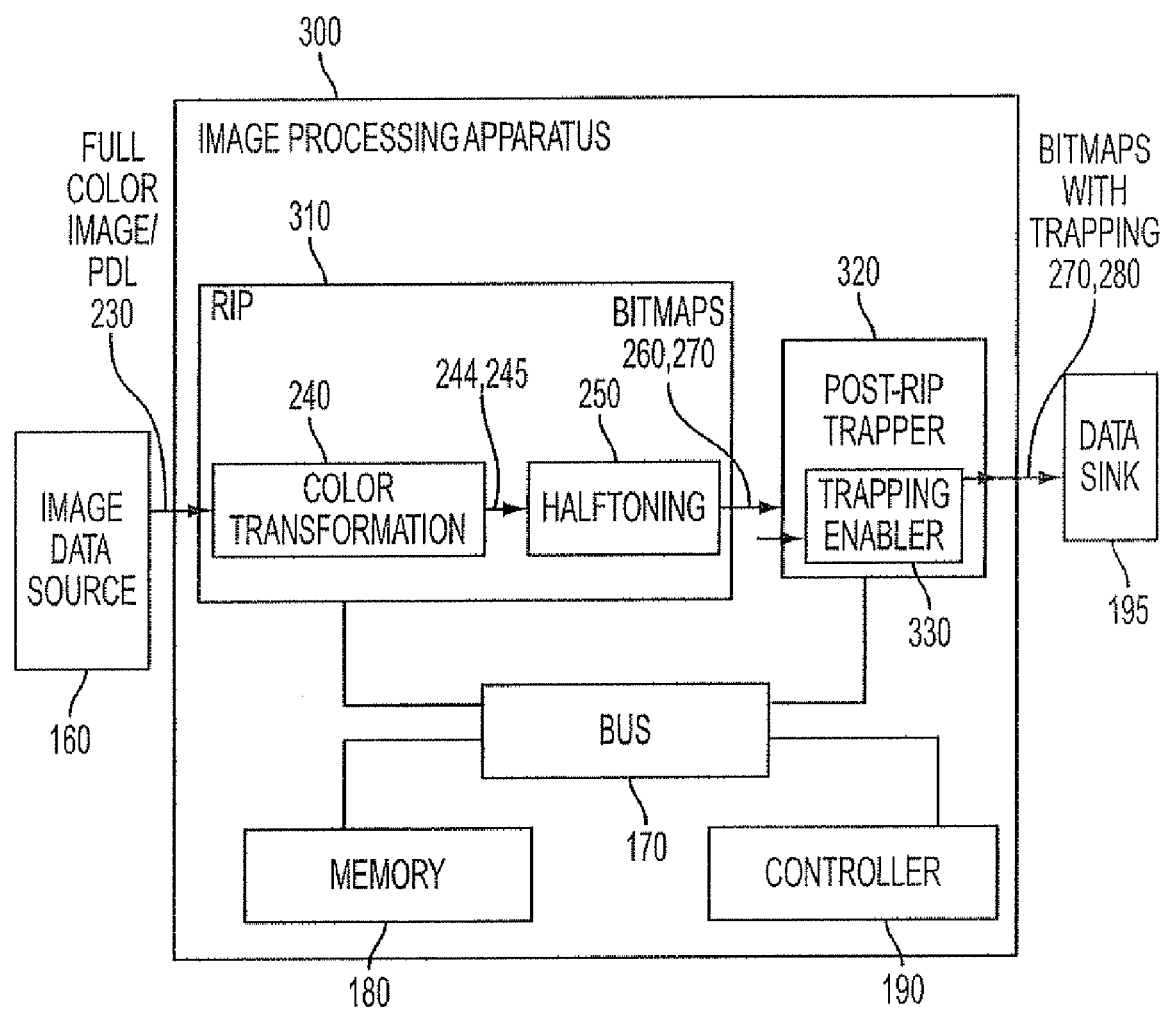
FIG. 7 is a functional block diagram illustrating a different exemplary embodiment of an image processing apparatus.

In a second embodiment, the tag plane can be approximated by comparing the color and highlight bitmaps 260, 270. FIG. 7 illustrates an image processing apparatus 300 that inputs a full color image 230 and outputs a color bitmap 270 and a trapped highlight bitmap 280. As shown in FIG. 7, the RIP 310 does not have a tag plane generator as is the case in the first embodiment. Instead, the trapping determination for each pixel of whether it is eligible to be trapped is performed by a trapping enabler 330 that resides in the post-RIP trapper 320. For convenience, this determination will be referred to as "tagging," but it will be appreciated that this processing performed at a different step than the tagging in the first embodiment. That is, all processing directly related to trapping is performed after the RIP. The trapping enabler 330 compares the bitmap values at each pixel to nearby pixels at a trap radius r in the color bitmap 270 and highlight bitmap 260. It then determines if that pixel is eligible to be trapped. The trapping enabler 330 generates similar information to that of the tag plane 295.

The following exemplary process of the trapping enabler generates a tag state for each pixel as follows:
For each pixel at image coordinates (i,j)
    If $H(i,j)==1$
        $T(i,j)=0$
    Else
        If $K(k,l)==0$ and $K(i,j)==1$
            $T(i,j)=1$
        Else
            $T(i,j)=0$
where $H(i,j)$ and $K(i,j)$ represent the bitmap values in the highlight bitmap 260 and the color bitmap 270 at image coordinates (i,j), respectively; $T(i,j)$ is the equivalent tag value at pixel location (i,j); $K(k,l)$ is the bitmap value of a nearby pixel in the color bitmap 270 at pixel location (k,l), and $\|(i,j)-(k,l)\|$=trapping radius. The trapping radius can be arbitrarily selected, or can be set based on the observed extent of misregistration for a given system.

As shown by the pseudo code, if a subject pixel in the highlight bitmap 260 already has a bitmap value of "1," then trapping for the subject pixel would not change the initial bitmap value. That is, copying a nearby pixel in the highlight bitmap 260 that also has a bitmap value of "1" is redundant.

However, it is possible that the subject pixel can be tagged when the subject pixel has a bitmap value of "0" in the highlight bitmap. Here, when the color bitmap value is "1" and a nearby color pixel at a trapping distance r has a bitmap value of "0," then the pixel is tagged [T(i,j)=1] to identify the pixel is eligible to be trapped.

Once the equivalent tag status is available, the Post-RIP trapping may use the same criterion as in formula (2) described above to update the highlight bitmap.

Figure 8:
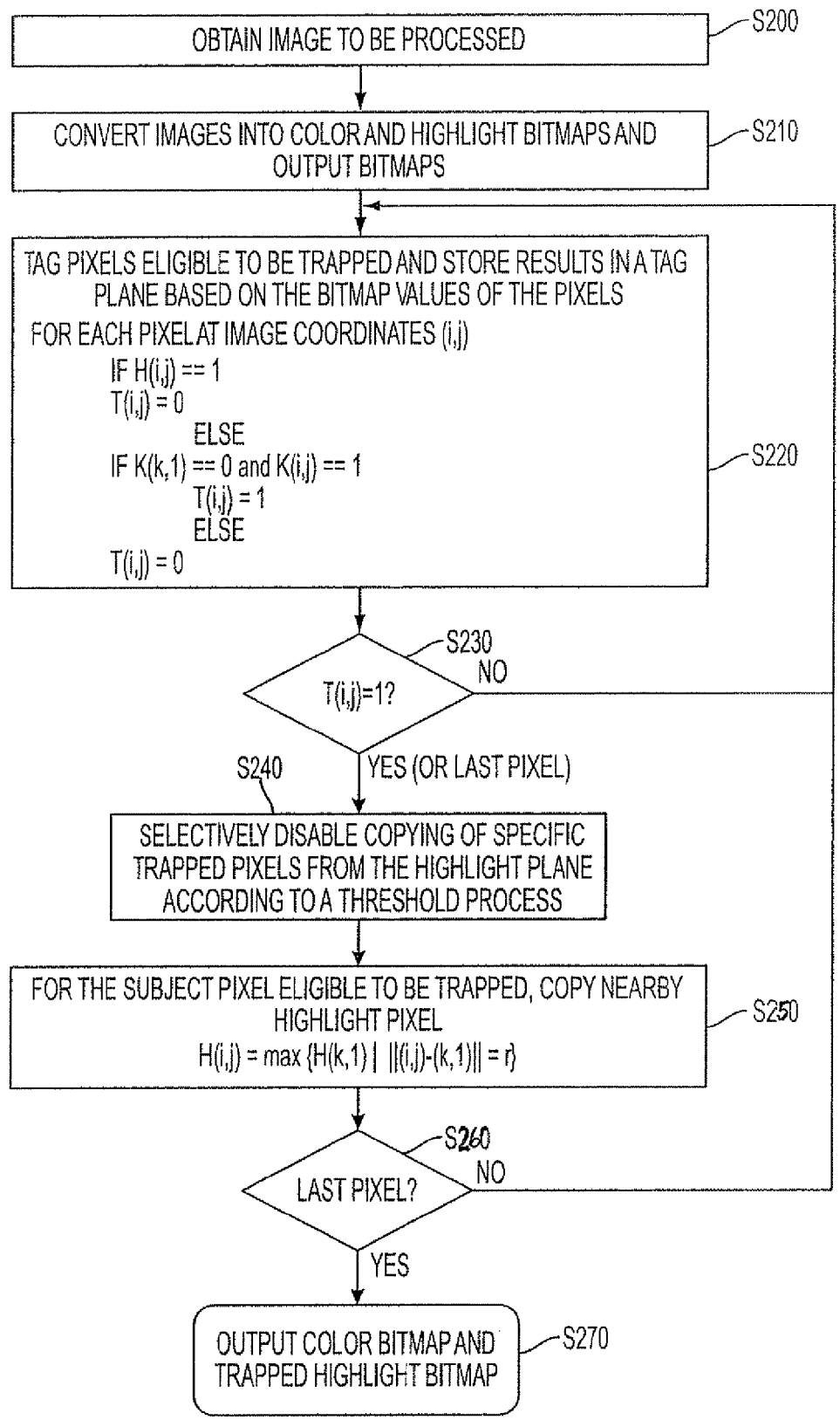
FIG. 8 is a flowchart illustrating a second exemplary trapping method.

FIG. 8 shows a second exemplary post-RIP trapping method. Specifically, step S200 obtains an image to be processed from the image data source. Step S210 is performed in the RIP 310. In step S210, the RIP 310 converts the highlight and color planes 244, 245 into bitmaps 260, 270 and outputs these bitmaps 260, 270 to the post-RIP trapper 320. In step S220, which takes place inside the Post-Rip Trapper at the trapping enabler module, tagging is performed to determine identification of pixels eligible to be trapped. The results based on bitmap values of the pixels may be output to S230 or may be stored in an image buffer. The image buffer may store a few scan lines of data (e.g., generated just-in-time for the next step), enough to include nearby pixel data at a trap distance r, or in a full "tag plane"-like form. The tagging process may, for example, generate tags as follows:
For each pixel at image coordinates (i,j)
    If $H(i,j)==1$
        $T(i,j)=0$
    Else
        If $K(k,l)==0$ and $K(i,j)==1$
            $T(i,j)=1$
        Else
            $T(i,j)=0$
That is, based on the bitmap value of each pixel in the highlight and the color bitmaps 260, 270, and based on the bitmap value of a nearby pixel at location (k,l), each pixel is either tagged a "1" or a "0." Step S230 determines whether the subject pixel is tagged (i.e. $T(i,j)=1$). If yes, step 250 applies the process of formula (2) as described above. If no, step S220 determines whether the next pixel is eligible for trapping. Step S250 involves iterating through each tagged pixel until the last pixel is processed. If all pixels have been processed, then step S270 outputs the trapped highlight bitmap 270 and the color bitmap 260 to the image sink 195.

An alternate process is to iterate S220 through every pixel and store the results to generate a tag plane bitmap. After all pixels are processed in S220, then S250 can process all tagged pixels.

Step S240 optionally selectively disables the copying of trapped pixels to soften the visual effect of the trapping artifacts. This method is performed through a threshold process that will be described below. Specific examples of threshold processes include stochastic screens, Bayer screens and random noise. The tagged pixels eligible to be removed are stored in one of the prior steps.

An advantage of the system and method described above in connection with FIGS. 7-8 is that trapping is possible even after the full color information is discarded in the RIP 310. The post-RIP trapper 320 can be added on to other applications without having to customize the post-RIP trapper for each RIP. Furthermore, in implementation, the trapping enabler 330 and the post-RIP trapper 320 can be combined and simplified.

Another advantage is that less processing is used. This is because the bitmaps 260, 270 contain less information than the full color image 230.

In the embodiments described above, post-RIP trapping can approximate the trapping done during RIP in terms of the visual effect while using less processing.

Figure 9:
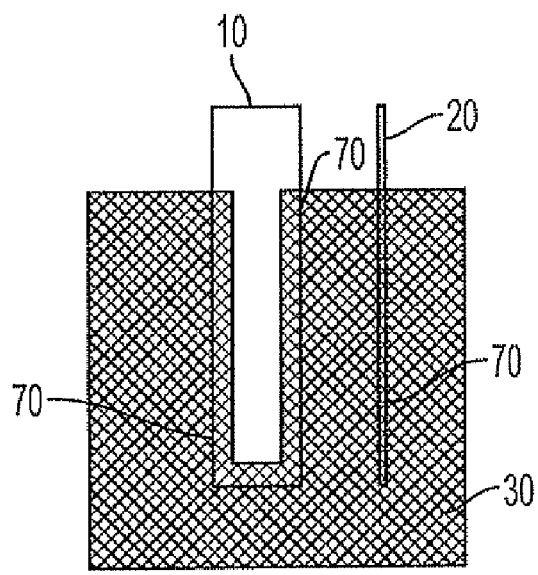
FIG. 9 illustrates the image of FIG. 1 having perfect registration after an exemplary method of trapping has been applied.
Figure 10:
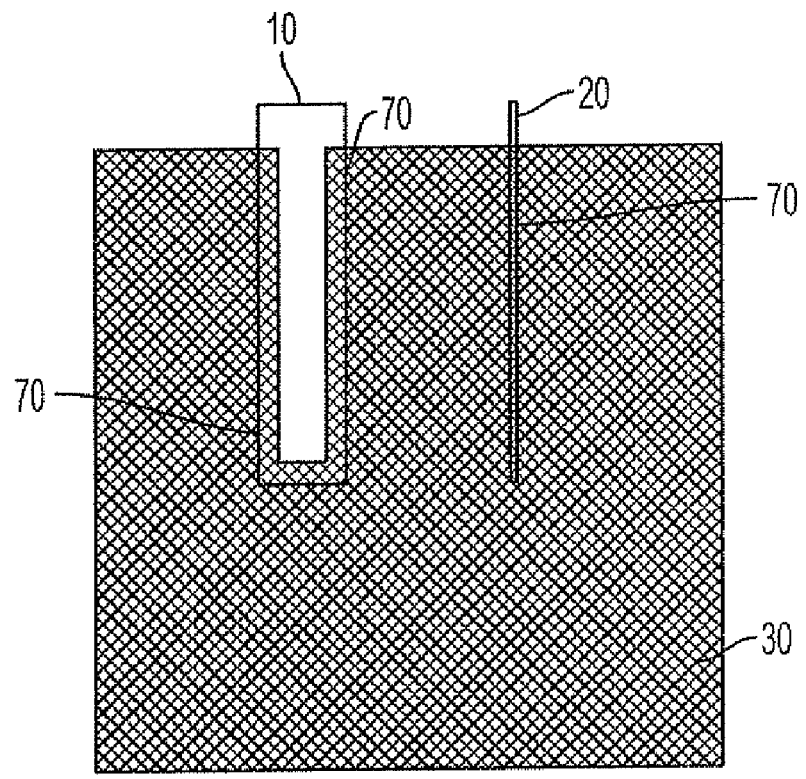
FIG. 10 is an enlargement of FIG. 9.
Figure 11:
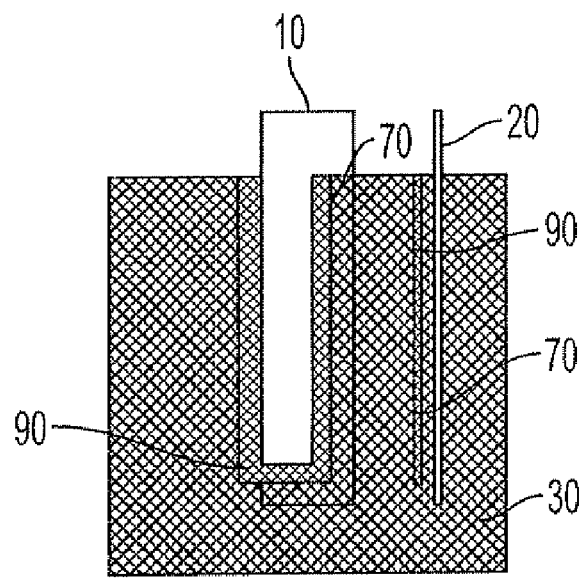
FIG. 11 illustrates the image of FIG. 3 having misregistration after an exemplary method of trapping has been applied.
Figure 12:
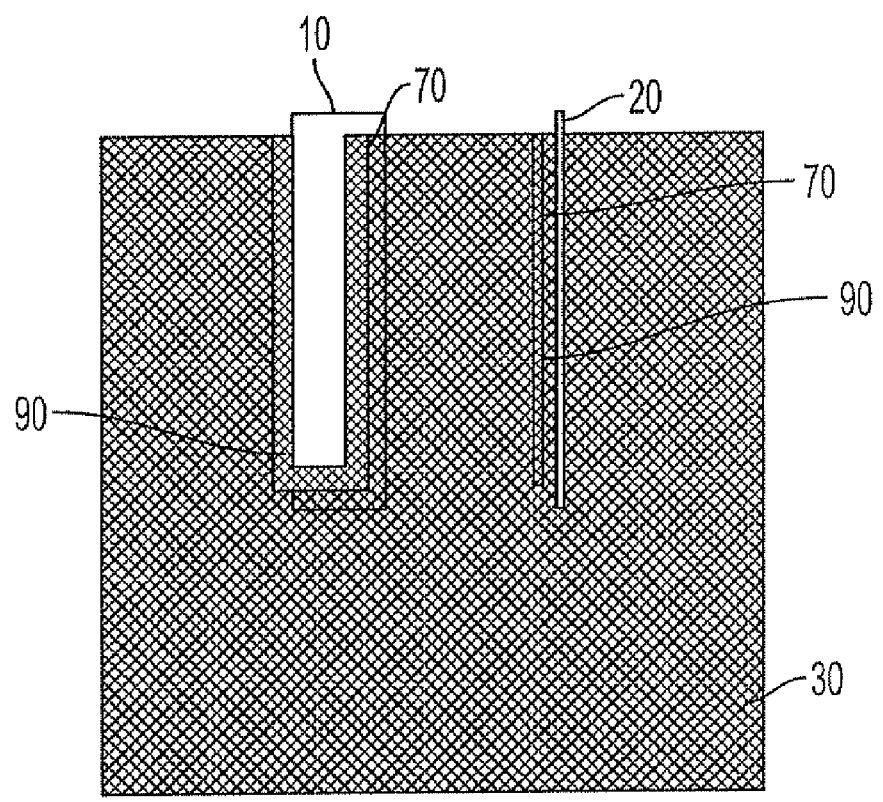
FIG. 12 is an enlargement of FIG. 11.
Figure 13:
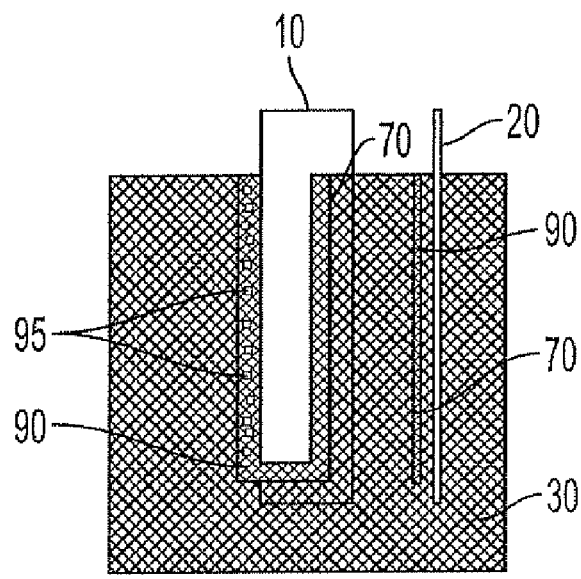
FIG. 13 illustrates the image of FIG. 3 having misregistration after an exemplary method of dithering-enabled trapping has been applied.
Figure 14:
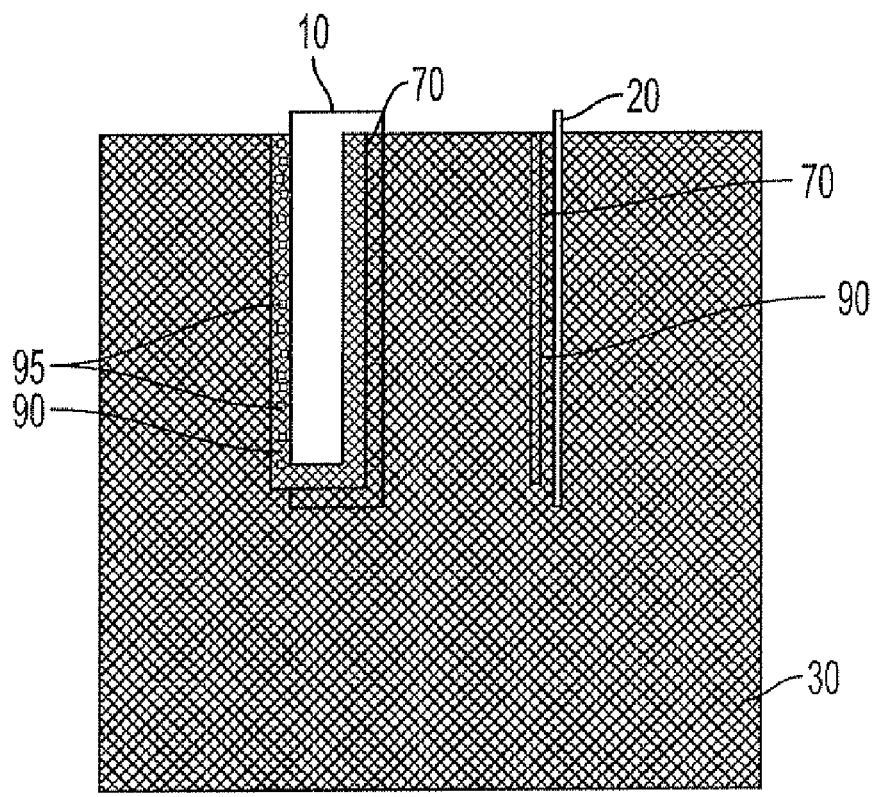
FIG. 14 is an enlargement of FIG. 13.

FIGS. 9-14 show some examples of trapping by either embodiment. FIGS. 10, 12 and 14 are an enlargement of FIGS. 9, 11 and 13, respectively. FIGS. 9 and 10 illustrate how trapping can be applied when there is perfect registration. The trap area 70 is the result of trapping methods described above, having both color and highlight pixels. As can be seen in FIG. 9, and more easily in FIG. 10, the halftone bitmap pattern of the highlight block 30 can be preserved in the trap area 70.

Figure 1:
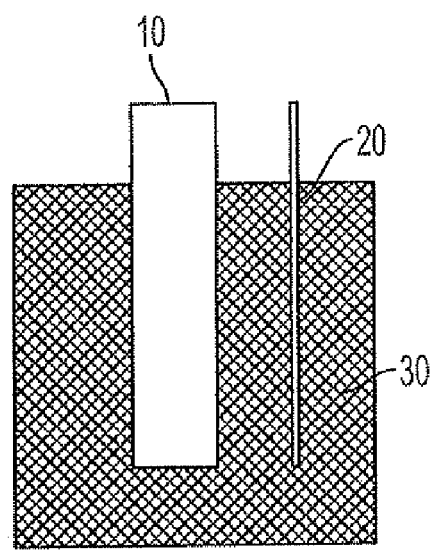
FIG. 1 illustrates an image printed with perfect registration.
Figure 2:
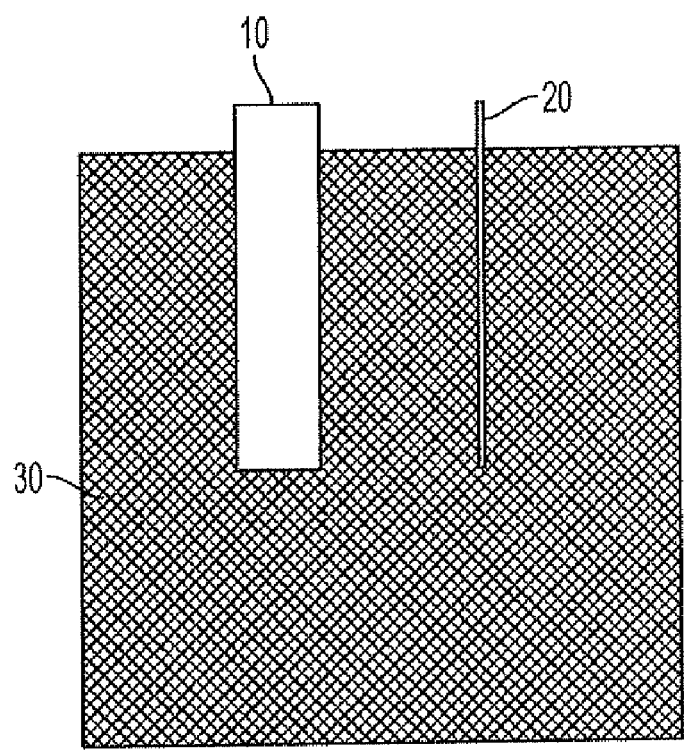
FIG. 2 is an enlargement of FIG. 1.
Figure 3:
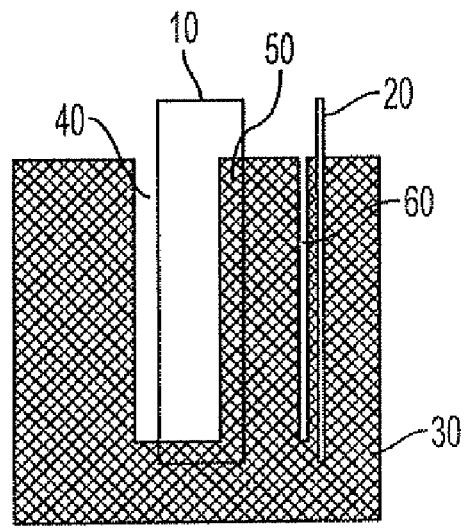
FIG. 3 illustrates an image printed with misregistration.
Figure 4:
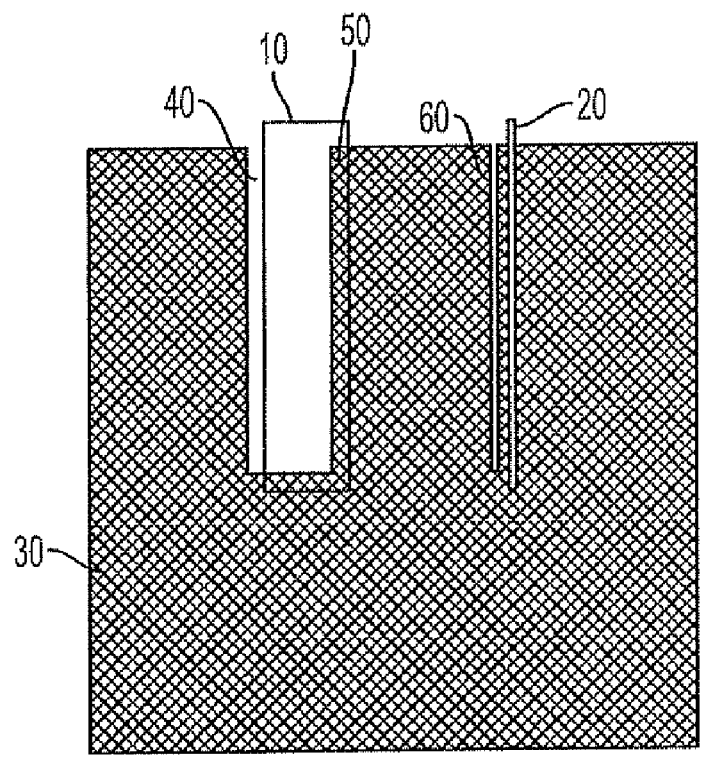
FIG. 4 is an enlargement of FIG. 3.

FIGS. 11 and 12 illustrate how trapping is applied when there is misregistration. As shown in FIGS. 3 and 4, the highlight block 30 is shifted up and to the left, relative to black regions 10, 20. The trap area 70 of FIGS. 10 and 11 is effective in reducing the visual effect of the misregistration. Here, the white gaps 20 and 40 of FIGS. 3 and 4 are no longer present due to the trapping methods described herein.

When copying the highlight pattern to the eligible trap area 70 using either embodiment, sometimes a visual discontinuity around the trap area can be observed. This discontinuity may be due to the copied halftone pattern not having the same halftone phase as the original halftone pattern. Optionally, in either embodiment, dithering-enabled trapping is possible to alleviate the phase discontinuity artifact. The post-RIP trapper 320 can selectively disable copying the nearby halftone pattern for some of the pixels 95 in the trap area 70 to soften the phase discontinuity artifact, as shown in pixel areas 90. As can be seen in FIGS. 13 and 14, pixel area 90 corresponds with trap area 70 in this embodiment. Which pixels are chosen may be based on a known threshold process. Examples of such threshold processes are a stochastic screen, a Bayer screen, and a random noise screen. The amount of pixels to be disabled for trapping and where these pixels are can be specified by consulting a halftone screen with a given value x. The pixels are disabled for trapping when x is less than the appropriate threshold value in the screen. If x is 0, none of the pixels in the trap area is disabled. In addition, a specific threshold process can be chosen to take into account the image characteristics of the image data. In general, a stochastic type screen is a preferred type of screen, since this type of screen does not have a distinct halftone frequency that may interfere with the existing color and highlight halftone patterns.

Figure 15:
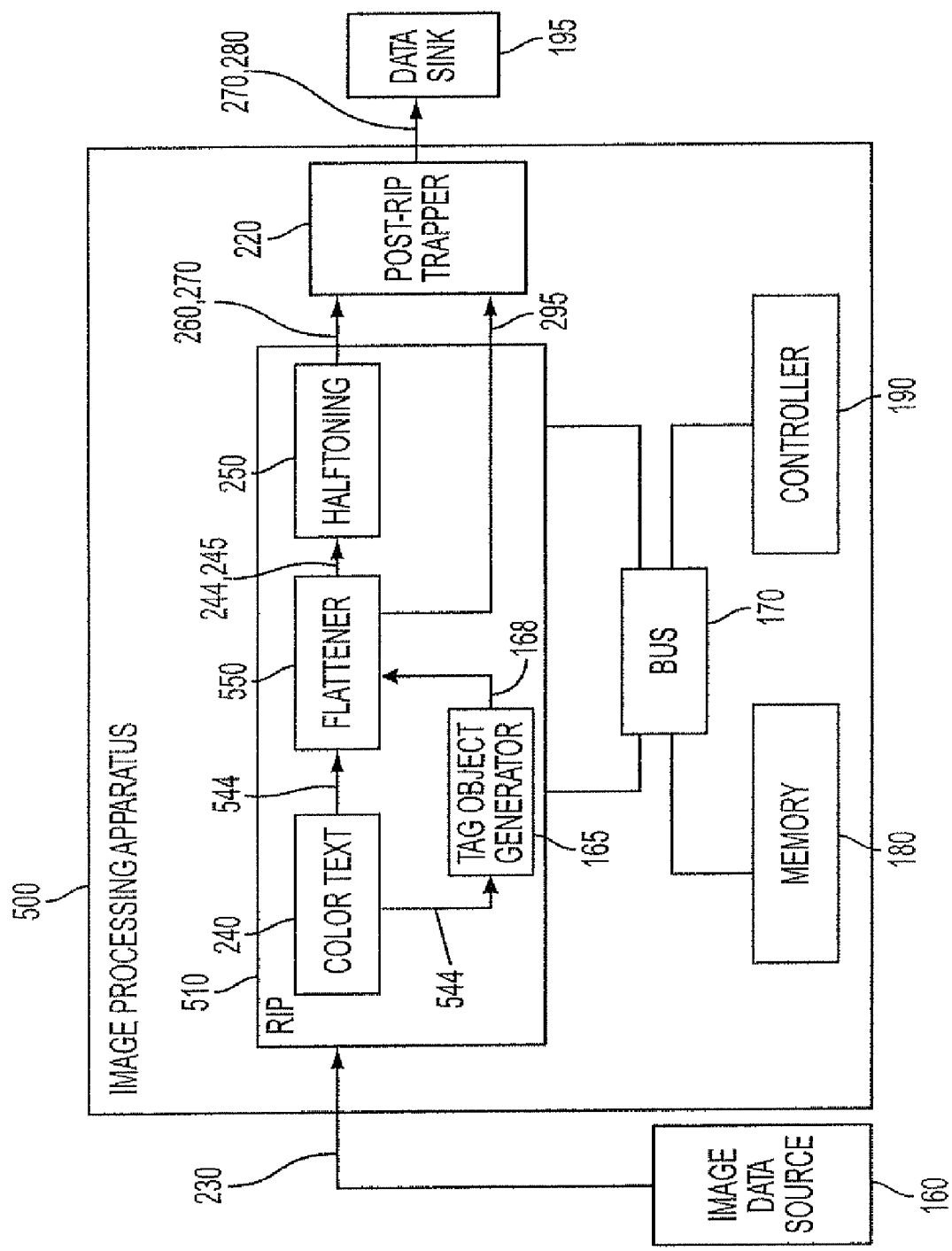
FIG. 15 is a functional block diagram illustrating another exemplary embodiment of an image processing apparatus.

FIG. 15 shows another exemplary embodiment of an image processing apparatus. Image processing apparatus 500 is similar to image processing apparatus 200, except as described below. FIG. 15 shows that a full color image 230 is obtained from an image data source 160. Inside the image processing apparatus 500, the full color image is sent to the RIP 510, which contains a tag object generator 165. The color transformation 240 converts the color in each object into the device color space, e.g. highlight and color (black). The output 544 from color transformation 240 is a series of objects with the color that is already in the device color space.

After color transformation 240, the tag object generator assigns "1" to objects which contain highlight values while the color (e.g. black) value is lower than the developable threshold.

The tag objects 168 are then flattened and rasterized from the object level data 544 into pixel level data stored in a tag plane 295 using the following formula:

$$T(i,j) = \begin{cases} 1, & \text{if } k(i,j) > k_0 \text{ and the tag object has value 1} \\ 0, & \text{else} \end{cases} \quad (3)$$

The flattener 550 also flattens and rasterizes the color transformed objects 544 into two contone planes 244, 245. These two contone planes 244, 245 then are halftoned and stored in the color and highlight bitmaps 260, 270. This embodiment may generate a slightly different result than the first two embodiments.

Figure 16:
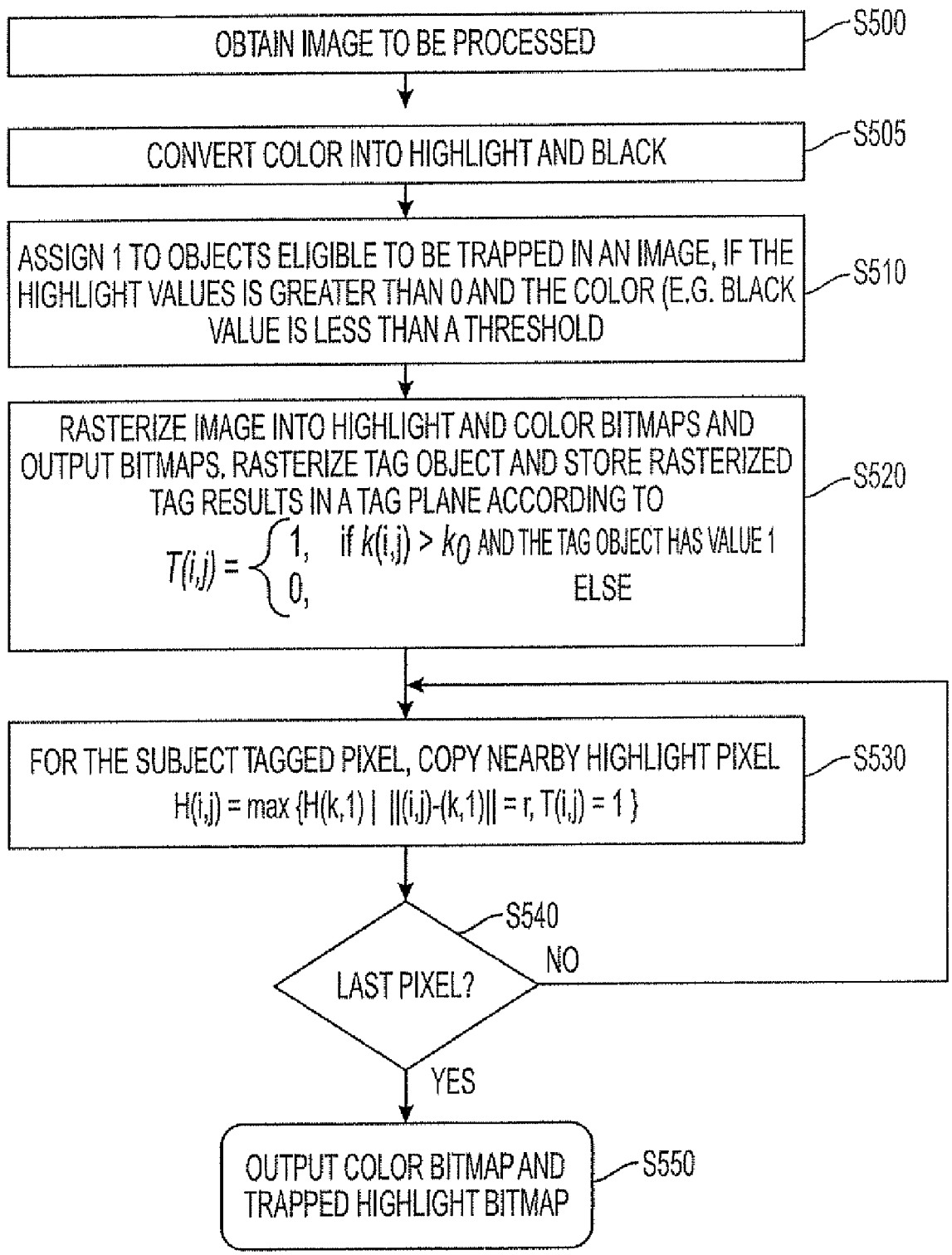
FIG. 16 is a flowchart illustrating a third exemplary trapping method.

FIG. 16 describes an exemplary method of post-RIP trapping where tag object information carried by the tag objects 168 is generated during raster image processing. This method is similar to the method of FIG. 6, except that in step S510, objects eligible to be trapped are marked temporarily. In step S520, the tagged object data 168 is then rasterized in the raster image processor 510 into pixel data using formula (3).

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

For example, the above methods describing a highlight plane can easily be applied to any two-color printing system. Alternatively, CMYK color space has 6 sets of two separations. It is understood that this process is applicable to each set of separations.

What is claimed is:

1. An image processing method, comprising:
    obtaining image data representing an image;
    performing raster image processing on the image data, the raster image processing converting the image data into a color bitmap and a highlight bitmap; and
    after the raster image processing, assigning to pixels eligible to be trapped a bitmap value copied from a nearby pixel that is separated from the pixels eligible to be trapped by a trapping radius, the pixels eligible to be trapped and the nearby pixel being in the same of the color bitmap or the highlight bitmap, wherein
    the step of assigning updates a bitmap value of a subject highlight pixel as follows:

$$H'(i,j) = \max\{H(k,l) \| (i,j)-(k,l)\|=r, T(i,j)=1\}$$

r is the trap radius,
    (i,j) is the subject highlight pixel,
    (k,l) is the nearby pixel at a distance of r from the subject pixel (i,j),
    T(i,j)=1 indicates the subject highlight pixel is eligible for to be trapped,
    H(k,l) is the bitmap value for the nearby highlight pixel, and
    H'(i,j) is the newly assigned bitmap value of the subject highlight pixel after trapping.

2. The image processing method of claim 1, further comprising:
    generating from the image data a color plane and a highlight plane, the color plane and the highlight plane having pixels containing contone values;
    generating a tag plane bitmap to designate the pixels eligible to be trapped, the designation for the pixels eligible to be trapped based on the respective contone values in the color plane and the highlight plane relative to predetermined threshold values for the color and the highlight color;

after the raster-image-processing, determining, from the tag plane bitmap, the pixels eligible to be trapped; and after the raster-image-processing, assigning to each pixel eligible to be trapped the bitmap value of the nearby pixel for the highlight bitmap.

3. The image processing method of claim 2, wherein the tag plane bitmap is generated as follows:

$$T(i, j) = \begin{cases} 1, & \text{if } k(i, j) > k_0 \text{ and } h(i, j) < h_0 \\ 0, & \text{else} \end{cases}$$

(i,j) is the subject pixel,
k(i,j) is the contone value of the color plane,
h(i,j) is the contone value of the highlight plane,
$k_0$ is the minimum level at which a color halftone pattern appears solid,
$h_0$ is the maximum level at which a highlight halftone pattern appears the color of the print medium, and
T(i,j) is the tag value of the subject pixel.

4. The image processing method of claim 1, further comprising:

after the raster image processing, designating pixels eligible for trapping.

5. The image processing method of claim 4, wherein designating pixels eligible for trapping is generated as follows:
If H(i,j)==1
  T(i,j)=0
Else
If K(k,l)==0 and K(i,j)==1
  T(i,j)=1
Else
T(i,j)=0
wherein
  (i,j) is the subject pixel,
  (k,l) is the nearby pixel at a distance of |(i,j)−(k,l)|=r from the subject pixel (i,j),
  T(i,j) indicates the tag value of the subject pixel,
  H(i,j) is the bitmap value for the subject highlight pixel,
  K(k,l) is the bitmap value of the nearby color pixel, and
  K(i,j) is the bitmap value for the subject color pixel.

6. The method of claim 1, further comprising
generating from the image data tag information, the tag information designating, for objects in the image data, objects eligible to be trapped;
rasterizing the tag information to designate the pixels eligible to be trapped;
generating a tag plane bitmap to store the pixels eligible to be trapped;
after raster-image-processing, determining, from the tag plane bitmap, the pixels eligible to be trapped; and
after raster-image-processing, assigning to each pixel eligible to be trapped the bitmap value of the nearby pixel for the highlight bitmap.

7. The method of claim 1, further comprising
selectively not copying some of the nearby pixels based on a dot pattern.

8. The method of claim 7, wherein the dot pattern is created by passing a tunable threshold to a screen.

9. The method of claim 8, wherein the screen is at least one of a stochastic screen, a Bayer screen or a random noise screen.

10. A xerographic marking device incorporating the method of claim 1.

11. An image processing apparatus, comprising
a raster image processor that obtains image data from an image source and generates from the image data a color plane and a highlight plane;
a post-raster-image-processor trapper for trapping image data output from the raster image processor, and
a memory, a bus and a controller for storing, processing and controlling the image data, wherein
the post-raster-image-processor trapper generates a trapped highlight bitmap that updates bitmap values as follows:

$$H'(i,j)=\max\{H(k,l) \| (i,j)-(k,l) \| =r, T(i,j)=1\}$$

wherein r is the trap radius,
(i,j) is the subject highlight pixel,
(k,l) is a nearby pixel at a distance of r from present pixel (i,j),
T(i,j)=1 indicates the subject highlight pixel is designated eligible for trapping,
H(k,l) is the bitmap value for the nearby highlight pixel, and
H'(i,j) is the newly assigned bitmap value of the subject highlight pixel after trapping.

12. The image processing apparatus of claim 11, further comprising:
a color transformation processor;
a tag plane generator; and
a halftoning block,
wherein
the color transformation processor, the halftoning processor and the tag plane generator are components of the raster image processor,
the color transformation processor transforms image data from an image source into the color plane and the highlight plane having contone values,
the tag plane generator generates a tag plane bitmap to designate pixels eligible to be trapped, the designation for each pixel based on the respective contone values in the color plane and the highlight plane relative to predetermined threshold values for the color and the highlight color, and
the halftoning block converts the color plane and the highlight plane into a color bitmap and a highlight bitmap.

13. The image processing apparatus of claim 11, wherein the tag plane generator generates the tag plane bitmap as follows:

$$T(i, j) = \begin{cases} 1, & \text{if } k(i, j) > k_0 \text{ and } h(i, j) < h_0 \\ 0, & \text{else} \end{cases}$$

(i,j) is the subject pixel,
k(i,j) is the contone value of the color plane,
h(i,j) is the contone value of the highlight plane,
$k_0$ is the minimum level at which a color halftone pattern appears solid,
$h_0$ is the maximum level at which a highlight halftone pattern appears the color of the print medium, and
T(i,j) is the tag state of the subject pixel.

14. The image processing apparatus of claim 11, further comprising:
a trapping enabler,
wherein the trapping enabler is a component of the post-raster-image-processor trapper, and the trapping enabler determines the tag state for each pixel.

15. The image processing apparatus of claim 14, wherein the trapping enabler generates a tag value T for each pixel in the post raster image processor trapper as follows:

If $H(i,j)==1$
   $T(i,j)=0$
Else
If $K(k,l)==0$ and $K(i,j)==1$
   $T(i,j)=1$
Else
$T(i,j)=0$
wherein
  (i,j) is the subject pixel,
  (k,l) is the nearby pixel at a distance of $\|(i,j)-(k,l)\|=r$ from the subject pixel (i,j),
  T(i,j) indicates the tag state of the subject pixel,
  H(i,j) is the bitmap value for the subject highlight pixel,
  K(k,l) is the bitmap value of the nearby color pixel, and
  K(i,j) is the bitmap value for the subject color pixel.

16. The image processing apparatus of claim 11, further comprising:
  a tag object generator; and
  a tag plane generator,
  wherein the tag object generator generates tag information from the color transformed image data, the color transformed image data having object information, the tag information designating the objects in the image data objects eligible to be trapped,
  the raster image processor rasterizes the tag object to designate the pixels eligible to be trapped, and
  the tag plane generator generates a tag plane bitmap to store the pixels eligible to be trapped.

17. A marking device that marks in only two colors comprising the image processing apparatus of claim 11.

18. A xerographic marking device comprising the image processing apparatus of claim 11.

* * * * *